Feb. 4, 1930.     H. V. E. VATINET ET AL     1,746,171
APPARATUS FOR REVEALING SHOCKS IN ANY MOVING MECHANISM
Filed Jan. 6, 1928

Inventors:
H. V. E. Vatinet
& C. Durand
By Langner, Parry, Card & Langner
Attys.

Patented Feb. 4, 1930

1,746,171

UNITED STATES PATENT OFFICE

HENRI VICTOR EUGENE VATINET AND CLAUDE DURAND, OF ORLY, FRANCE

APPARATUS FOR REVEALING SHOCKS IN ANY MOVING MECHANISM

Application filed January 6, 1928, Serial No. 245,019, and in France January 31, 1927.

The present invention has for its subject an apparatus adapted to reveal in any moving mechanism the most slight abnormal noises derived from shocks due for example to play in the members or in the moving parts.

This apparatus which serves in some respect to sounding the mechanisms is provided with an electromagnetic or electrostatic system of which one portion is disposed so as to receive as integrally as possible vibrations produced in the members of the mechanism which it is desired to sound and of which the other part is suspended in such a manner as to remain inert, that is to say, so as not to receive the vibrations in question, these two parts being such that very small relative movements produce, by induction or in a similar manner, currents of audible frequency in a circuit which controls directly or not, either a telephone receiver or an oscillograph combined or not with a sonometer.

The vibrating portion of the electromagnetic or electrostatic system may be integrally or rigidly secured to a case of which one portion may be brought into contact with one of the members of the mechanism to be sounded and the inert portion is preferably suspended or maintained in the interior of this case by means of a soft or plastic material which does not transmit vibrations. The invention, however, is not limited to this preferred method of actuation.

The accompanying drawing illustrates by way of example two forms of construction of the invention.

Figure 1:
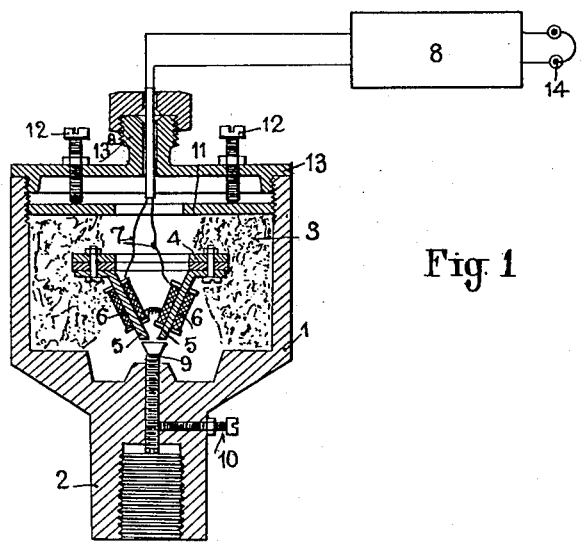
Figure 1 is a vertical section of one form of construction of the apparatus which receives the vibrations, and indicates diagrammatically the mounting of the unit.

According to the form of construction illustrated in Figure 1, the apparatus adapted to sound internal combustion engines, for example, is provided with a metal case 1 preferably of iron and provided with an extension 2 having a screw threaded hole in such a manner that the case may be mounted on a screw or threaded pin projecting from the case of the engine.

This case is partially filled with a plastic or soft material indicated at 3 and composed for example of froth of rubber in such a manner as not to transmit the vibrations of the case to the inert portion of the electric device which it encloses. In the example illustrated this device consists of an electromagnetic system supported by the froth of rubber which acts as a shock absorber.

This electromagnetic system is provided with a permanent magnet 4, of circular shape for example, to which are secured two branches or armatures 5 on which are mounted coils 6 of which the windings are connected in series and are connected by two very flexible wires 7 to a valve amplifier having two stages of amplification, indicated diagrammatically at 8 in Figure 1.

The branches 5 converge towards an armature secured to the case 1 and formed in the example illustrated by a screw 9 locked in a suitable position, that is to say at the desired distance from the armatures 5, by means of a locking screw 10 with a lock nut.

On the froth of rubber is located a plate 11 of non-magnetic material, brass for example, which serves to adjust the elasticity of the mass 3 according as to whether it is applied more or less strongly against this by means of pressure screw 12 provided with lock nuts and screwed into the cover 13 which in turn is screwed to the case 1. This cover is provided with a small boss 13$^a$ through which passes an insulating sleeve for the passage of the wires 7.

From the amplifying apparatus 8 leads a casing provided with two listening devices or telephone receivers 14. As stated above this casing may be replaced by an oscillograph and, irrespective of the receiving apparatus employed, it may be combined with a sonometer.

The operation of this apparatus is as follows:—

Assuming that it is mounted on an internal combustion engine which is running, the apparatus will vibrate in the same manner as the entire engine and the armature 9 participates of this vibrating movement whilst the magnet 4 and its branches 5 remain stationary. There consequently results a periodic variation in the iron which gives rise in the circuits of the coils 6 to an electromotive force. In this manner the observer perceives in the receiving devices, if the operation of the engine is perfect, a regular noise or a purring noise which indicates that the engine is running normally and is well balanced.

If, on the contrary, by reason of play there are produced shocks, even though weak, in the moving members, there results, by reason of the high conductivity of the metal for sound vibrations, that these shocks will be transmitted to the armature 9 and this will no longer vibrate uniformly. This irregularity produces a variation in the induced electromotive force, which variation is immediately revealed in the listening or receiving devices.

It will be understood that for localizing the defective point a number of points of the engine may be fitted with means so as to enable the device to be fitted thereon.

The apparatus actuated in this manner is extremely sensitive, and when suitably adjusted it enables the noises of a watch or clockwork mechanism to be studied.

Figure 2:
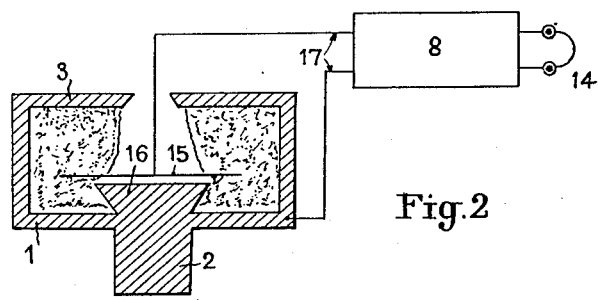
Figure 2 is a similar view to that of Figure 1 of a modification.

What has been stated above also applies to the apparatus illustrated in Figure 2 in which the electromagnetic system is replaced by an electrostatic system which is essentially provided with an armature 15 enclosed in the froth of rubber 3 and an armature 16 integral with the case 1, the electromotive force induced in the circuit 17 is produced by the variation of the thickness of the dielectric.

This apparatus is of considerbale interest for application to aerostats and to all cases where the engine or engines are not accessible to the mechanic. One or more apparatus mounted on the engine or engines and suitably connected to the mechanics post in the keelson enables him to be advised at any instant as to the operation of the engines.

We claim:

1. Induction means for detecting shocks comprising a casing, electrical means elastically suspended in said casing adapted to be intercalated in circuit with means for translating current fluctuations into signals, and a rigid metallic member spaced from said electrical means so that relative movement between said metallic member and said electrical means will modify the current in said circuit and means upon said rigid member for fixedly connecting the same to a vibrating body, for transmitting shocks beyond the normal hum of said vibrating body.

2. Induction means for detecting shocks comprising a casing, electrical means elastically suspended in said casing adapted to be intercalated in circuit with means for translating current fluctuations into signals, and a rigid metallic member spaced from said electrical means so that relative movement between said metallic member and said electrical means will modify the current in said circuit, means upon said rigid member for fixedly connecting the same to a vibrating body for transmitting shocks beyond the normal hum of said vibrating body, and a cushion of sponge rubber for suspending said electrical means.

3. Induction means for detecting shocks comprising a casing, electrical means elastically suspended in said casing adapted to be intercalated in circuit with means for translating current fluctuations into signals, and a rigid metallic member spaced from said electrical means so that relative movement between said metallic member and said electrical means will modify the current in said circuit, means upon said rigid member for fixedly connecting the same to a vibrating body for transmitting shocks beyond the normal hum of said vibrating body, a cushion of sponge rubber suspending said electrical means and means for varying the elasticity of said cushion.

4. Induction means for detecting shocks comprising a casing, electrical means elastically suspended in said casing adapted to be intercalated in circuit with means for translating current fluctuations into signals, and a rigid metallic member spaced from said electrical means so that relative movement between said metallic member and said electrical means will modify the current in said circuit, means upon said rigid member for fixedly connecting the same to a vibrating body for transmitting shocks beyond the normal hum of said vibrating body, the electrical means comprising an electro-magnet with which the said rigid member functions as the armature.

HENRI VICTOR EUGENE VATINET.
CLAUDE DURAND.